US012439193B2

(12) United States Patent
Machida

(10) Patent No.: US 12,439,193 B2
(45) Date of Patent: Oct. 7, 2025

(54) EARPHONE, EARPHONE CONTROL METHOD, AND PROGRAM

(71) Applicant: PANASONIC INTELLECTUAL PROPERTY MANAGEMENT CO., LTD., Osaka (JP)

(72) Inventor: Takanobu Machida, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 201 days.

(21) Appl. No.: 18/333,306

(22) Filed: Jun. 12, 2023

(65) Prior Publication Data

US 2023/0403493 A1 Dec. 14, 2023

(30) Foreign Application Priority Data

Jun. 13, 2022 (JP) ................................ 2022-095155

(51) Int. Cl.
*H04R 1/10* (2006.01)
*H04R 1/28* (2006.01)

(52) U.S. Cl.
CPC ......... *H04R 1/1041* (2013.01); *H04R 1/1016* (2013.01); *H04R 1/2849* (2013.01); *H04R 2460/11* (2013.01)

(58) Field of Classification Search
CPC .. H04R 1/1041; H04R 1/1016; H04R 1/2849; H04R 2460/113811
See application file for complete search history.

(56) References Cited

U.S. PATENT DOCUMENTS

| | | | |
|---|---|---|---|
| 2007/0177753 A1 | 8/2007 | Weinans et al. |
| 2012/0082335 A1 | 4/2012 | Duisters et al. |
| 2012/0321103 A1 | 12/2012 | Smailagic et al. |
| 2020/0260197 A1 | 8/2020 | Thomsen et al. |

FOREIGN PATENT DOCUMENTS

| | | |
|---|---|---|
| JP | 2009525629 A | 7/2009 |

OTHER PUBLICATIONS

Extended European Search Report dated Nov. 3, 2023, for the corresponding European Patent Application No. 23178687.2, 10 pages.

*Primary Examiner* — David L Ton
(74) *Attorney, Agent, or Firm* — Seed Intellectual Property Law Group LLP

(57) ABSTRACT

An earphone includes a housing having a space therein and an air-permeable path from one end of an ear canal of a user to another end of the ambient environment, an opening and closing valve accommodated in the housing and capable of blocking a part of the path, a speaker accommodated in the housing and configured to output a sound signal, a first microphone configured to detect a leakage amount of a sound output from the speaker and leaking from an ear of the user, and a control unit configured to cause the speaker to output the sound signal. The control unit sets the opening and closing valve to an open state or a closed state based on a volume of the sound signal or the leakage amount of the sound.

10 Claims, 10 Drawing Sheets

EARPHONE, EARPHONE CONTROL METHOD, AND PROGRAM

CROSS-REFERENCE TO RELATED APPLICATIONS

This application is based on and claims priority under 35 USC 119 from Japanese Patent Application No. 2022-095155 filed on Jun. 13, 2022, the contents of which are incorporated herein by reference.

TECHNICAL FIELD

The present disclosure relates to an earphone, an earphone control method, and a program.

BACKGROUND ART

Patent Literature 1 discloses an earphone with a leakage control function, which can be switched between states with and without leakage to adapt to different listening situations. The earphone is shaped and configured to be disposed to substantially cover an ear canal. The earphone includes a housing that accommodates a speaker element emitting sound to the ear canal and has a channel extending from an inner end facing the ear canal to an outer end facing a peripheral side. The earphone includes a closure means capable of switching between a closed state in which the channel is substantially closed and an open state in which the channel transmits sound from the surroundings.

CITATION LIST

Patent Literature

Patent Literature 1: JP2009-525629A

SUMMARY OF INVENTION

In the related art, earphones are respectively inserted into left and right ears of a user to seal ear canals of the user, thereby allowing the user to listen to an output sound in a state in which ambient environmental noise is blocked. In recent years, earphones provided with a microphone that picks up external sounds together with a speaker have been introduced. The earphones analyze the sound picked up by the microphone to perform noise cancellation and output a high-quality sound with reduced noise of the ambient environment from the speaker. However, when the user speaks while wearing the earphones (for example, when making a phone call), the user may have a feeling that his or her voice is muffled and may be difficult to talk.

In Patent Literature 1, the earphone controls the channel of the housing to change between sealed and non-sealed states of the ear canal of the user. The earphone disclosed in Patent Literature 1 closes the channel and seals an ear of the user when playing music, and opens the channel and opens the ear of the user when the user is making a phone call. However, when the user prefers a sound with a wide sound field, the user needs to listen to music without sealing the ear canal. In view of such a need, when the sealed state of the earphone is released while the user is listening to music, sound leakage to the surroundings (hereinafter, referred to as sound leakage) may occur.

The present disclosure has been made in view of the above situations in the related art, and an object of the present disclosure is to adaptively control a sealed state or an open state of an earphone according to the ambient environment.

The present disclosure provides an earphone including: a housing having a space therein and an air-permeable path from one end of an ear canal of a user to another end of the ambient environment located at the other end of the ear canal; an opening and closing valve accommodated in the housing and capable of blocking a part of the path; a speaker accommodated in the housing and configured to output a sound signal; a first microphone configured to detect a leakage amount of a sound output from the speaker and leaking from an ear of the user; and a control unit configured to cause the speaker to output the sound signal. The control unit sets the opening and closing valve to an open state or a closed state based on a volume of the sound signal or the leakage amount of the sound.

Further, the present disclosure provides an earphone control method including a housing having a space therein and an air-permeable path from one end of an ear canal of a user to another end of the ambient environment located at the other end of the ear canal, and an opening and closing valve accommodated in the housing and capable of blocking a part of the path. The earphone control method includes outputting a sound signal; detecting a leakage amount of a sound leaking from an ear of the user; outputting the sound signal; and setting the opening and closing valve to an open state or a closed state based on a volume of the sound signal or the leakage amount of the sound.

Further, the present disclosure provides a non-transitory computer-readable storage medium on which a computer program causing a computer to execute the earphone control method mentioned as above is stored These comprehensive or specific aspects may be implemented by a system, a device, a method, an integrated circuit, a computer program, a recording medium, or any combination of the system, the device, the method, the integrated circuit, the computer program, and the recording medium.

According to the present disclosure, it is possible to adaptively control a sealed state or an open state of an earphone according to the ambient environment.

DESCRIPTION OF EMBODIMENTS

Hereinafter, an earphone, an earphone control method, and a program according to an embodiment of the present disclosure will be described in detail with reference to the drawings. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

Figure 1:
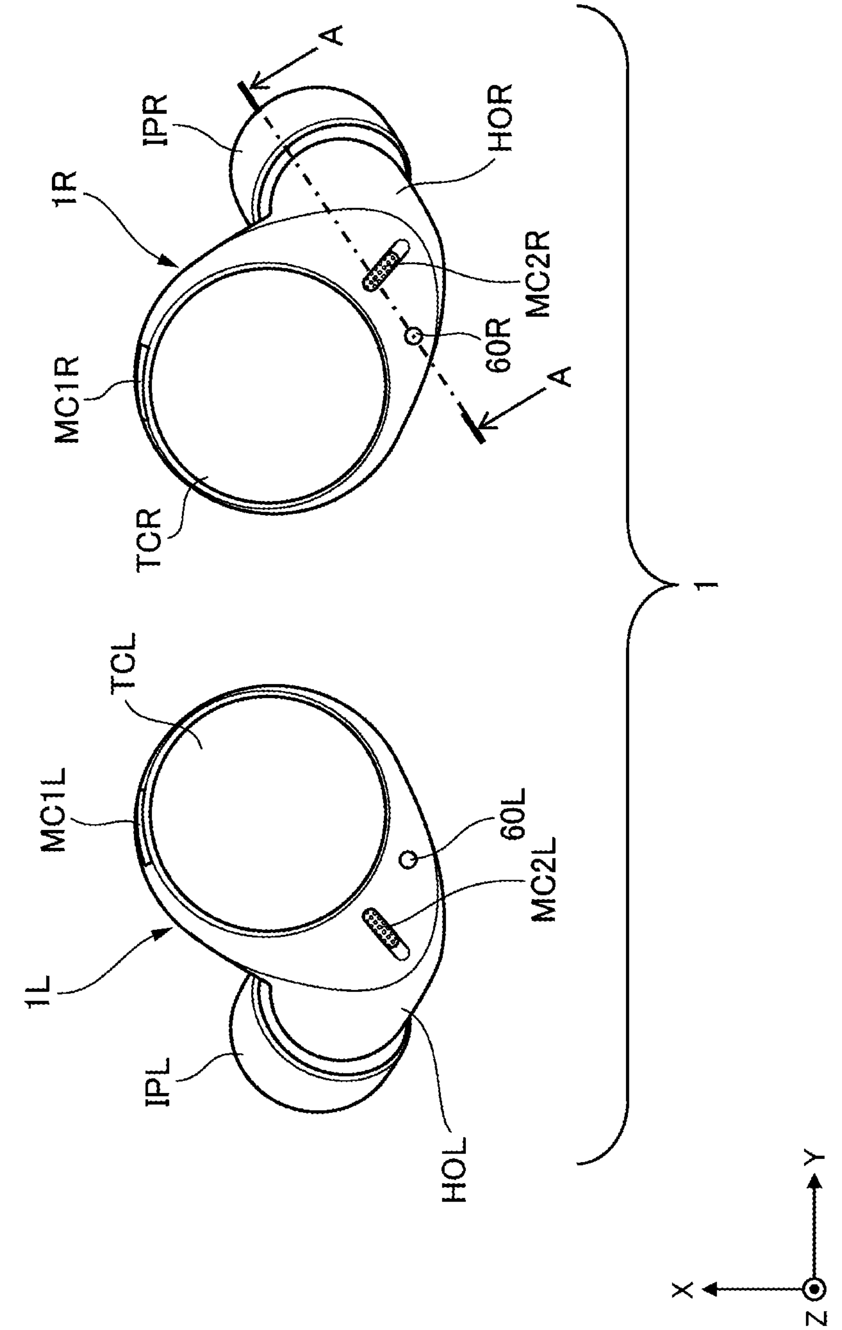
FIG. 1 is a front view of an earphone.
Figure 2:
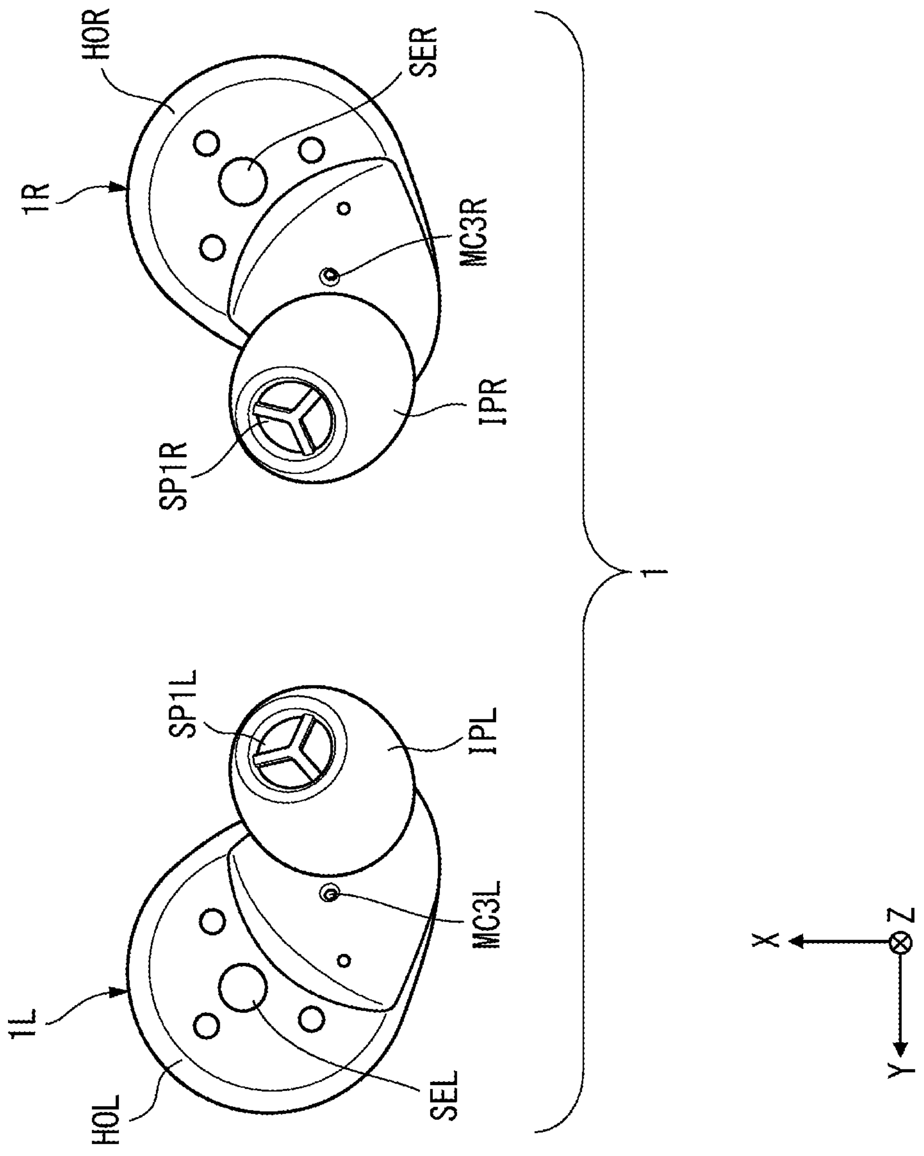
FIG. 2 is a rear view of the earphone.

First, a hardware configuration of the earphone will be described with reference to FIGS. 1 and 2. FIG. 1 is a front view of the earphone. FIG. 2 is a rear view of the earphone.

For convenience of description, an X axis and a Y axis are defined along a plane parallel to a surface of a touch sensor TCL of an earphone 1L as shown in FIG. 1, and an axis orthogonal to the surface of the touch sensor TCL is defined as a Z axis. When a microphone MC1L of the touch sensor TCL is taken as an upper end side with respect to the earphone 1L and a microphone MC2L opposite to the microphone MC1L of the touch sensor TCL is taken as a lower end side, an axis extending from the lower end side to the upper end side is taken as the X axis. An axis perpendicular to the X axis and the Z axis is defined as the Y axis. In the present embodiment, the orientation of the earphone 1L shown in FIG. 1 is defined as the front view. The expressions related to these directions are used for convenience of description and are not intended to limit the attitude of the structure in actual use. The same applies to other drawings.

In the present embodiment, in a pair of left and right earphones 1L and 1R, configurations of the left ear earphone 1L and the right ear earphone 1R are the same. The reference numerals of the same components are represented by adding "L" to the end of the left ear earphone 1L and adding "R" to the end of the right ear earphone 1R. In the following description, only the left earphone 1L will be described and the description of the right earphone 1R will be omitted.

An earphone 1 includes the earphones 1L and 1R, which are worn on left and right ears of a user, respectively, and a plurality of earpieces having different sizes are attached to one end side of each of the earphones 1L and 1R in a replaceable manner. The earphone 1 may be implemented with two independently operable earphones (that is, the earphone 1L and the earphone 1R) including the earphone 1L worn on the left ear of the user and the earphone 1R worn on the right ear of the user. In this case, the earphone 1L and the earphone 1R can communicate wirelessly (for example, short-range wireless communication such as Bluetooth (registered trademark)). Alternatively, the earphone 1 may be implemented with a pair of earphones in which the earphone 1L and the earphone 1R are connected by a wire (in other words, a cable such as a wire).

As shown in FIG. 1, the earphone 1L is an inner acoustic device that is worn on the ear of the user and used and receives sound data (for example, music data) transmitted wirelessly (for example, short-range wireless communication such as Bluetooth (registered trademark)) from an external device such as a smartphone or a portable music player carried by the user. The earphone 1L acoustically outputs a sound signal based on the received sound data. In addition, the earphone 1L is placed on a cradle (not shown) which is a charging case when not in use. In a case where a battery B1L (FIG. 3) built in the earphone 1L is not fully charged, when the earphone 1L is placed on a predetermined placement position of the cradle, the battery B1L built in the earphone is charged based on the power transmitted from the cradle.

A housing HOL is provided as a structural member of the earphone 1L. The housing HOL is provided as a composite of materials such as synthetic resin, metal, and ceramic, and an accommodation space in which various members constituting the earphone 1L are accommodated is formed in the housing HOL. The housing HOL is provided with a mounting cylindrical portion FCL1 (see FIGS. 3 and 4) communicating with the accommodation space. The mounting cylindrical portion FCL1 is provided on one end of the housing HOL opposite to the touch sensor TCL to be described later.

The earphone 1L includes an earpiece IPL attached to a main body of the earphone 1L. For example, the earphone 1L is held in a state of being inserted into an ear canal of the ear of the user by the earpiece IPL, and this held state is a use state of the earphone 1L.

The earpiece IPL is made of a flexible member such as silicon and is injection-molded with an inner cylindrical portion (not shown) and an outer cylindrical portion (not shown). The earpiece IPL is inserted into and fixed to the mounting cylindrical portion FCL1 of the housing HOL with the inner cylindrical portion thereof, and is provided to be replaceable (detachable) with respect to the mounting cylindrical portion FCL1 of the housing HOL. The earpiece IPL is worn on the ear canal of the user with the outer cylindrical portion thereof, and is elastically deformed according to a shape of the ear canal on which the earpiece IPL is worn. By this elastic deformation, the earpiece IPL is held in the ear canal of the user. The earpiece IPL has a plurality of different sizes. As for the earpiece IPL, an earpiece of any size among a plurality of earpieces of different sizes is attached to the earphone 1L and worn on the left ear of the user.

As an example of an operation input unit, the touch sensor TCL is provided on the other end opposite to the one end of the housing HOL on which the earpiece IPL is disposed as shown in FIG. 1. The touch sensor TCL is a sensor element having a touch sensor function of detecting an input operation (for example, a touch operation) of the user. The sensor element is, for example, an electrode of a capacitive touch sensor. The touch sensor TCL may be formed as, for example, a circular surface, or may be formed as, for example, an elliptical surface. The touch sensor TCL may be formed as a rectangular surface.

Examples of the touch operation performed on the touch sensor TCL by a finger of the user include the following operations. When a touch operation is performed for a short time, the earphone 1L may instruct an external device to perform any one of playing music, stopping music, skipping forward, skipping back, or the like. When a touch operation (a long-press touch) is performed for a long time, the earphone 1L may perform a pairing operation or the like for performing wireless communication with an external device such as a smartphone using Bluetooth (registered trademark) or the like. When the user touches a surface of the touch sensor TCL with a finger (a swiping operation), the earphone 1L may perform, for example, volume adjustment of music being played.

An opening 60L is a hole formed in the housing HOL and communicates with an air-permeable path from one end of the ear canal of the user to the other end of the ambient environment. A cross-sectional example of a detailed structure of the opening 60L will be described later with reference to FIGS. 3 and 4.

The earphone 1L includes a plurality of microphones (the microphone MC1L, the microphone MC2L, and a microphone MC3L) as electric/electronic members. The plurality of microphones are accommodated in the accommodation space (not shown) of the housing HOL.

As shown in FIG. 1, the microphone MC1L is provided to be exposed on the surface or in the vicinity of the surface of the housing HOL, and is disposed to be capable of picking up an ambient sound or the like outside the earphone 1L. That is, the microphone MC1L can detect an ambient sound of the user in a state in which the earphone 1L is worn on the ear of the user. The microphone MC1L converts the outside ambient sound into an electric signal (sound signal) and sends the electric signal to a sound signal input and output control unit S1L.

As shown in FIG. 1, the microphone MC2L is provided to be exposed on the surface or in the vicinity of the surface of the housing HOL, and is disposed to be capable of picking up a voice signal based on a speech of the user wearing the earphone 1L. Therefore, the earphone 1L can implement a hands-free call in a state in which the earphone 1L can communicate with a mobile phone device such as a smartphone F1 of the user. The microphone MC2L is implemented with a microphone device capable of picking up a voice (that is, detecting a voice signal) generated based on a speech of the user. The microphone MC2L picks up a voice generated based on a speech of the user, converts the voice into an electric signal, and transmits the electric signal to the sound signal input and output control unit S1L. The microphone MC2L is disposed such that an extending direction of the earphone 1L faces a mouth of the user when the earphone 1L is inserted into the left ear of the user (see FIG. 1), and is disposed at a position below the touch sensor TCL (that is, in a −X direction). The voice of the user is picked up by the microphone MC2L and converted into an electric signal, and the presence or absence of a speech of the user can be detected by the microphone MC2L according to the magnitude of the electric signal.

As shown in FIG. 2, the microphone MC3L is disposed in a surface in the vicinity of the mounting cylindrical portion FCL1 of the housing HOL, and is disposed as close as possible to an ear canal of the left ear of the user when the earphone 1L is inserted into the left ear of the user. The microphone MC3L converts a sound leaking from between the left ear of the user and the earpiece IPL in a state in which the earphone 1L is worn on the left ear of the user into an electric signal (sound signal) and transmits the electric signal to the sound signal input and output control unit S1L.

As shown in FIG. 2, a speaker SP1L is disposed in the mounting cylindrical portion FCL1 of the housing HOL. The speaker SP1L is an electronic component and acoustically outputs sound data (for example, music data) wirelessly transmitted from an external device. In the housing HOL, a front surface of the speaker SP1L (in other words, a sound output surface of a sound to be acoustically output) faces the mounting cylindrical portion FCL1 of the housing HOL covered with the earpiece IPL. As a result, the music data acoustically output from the speaker SP1L is further transmitted from an ear hole (for example, an external ear) of the user to the ear canal of the external ear and an eardrum of a middle ear, and the user can listen to the music data.

A wearing sensor SEL is implemented with a device that detects whether the earphone 1L is worn on the left ear of the user and is implemented with, for example, an infrared sensor or an electrostatic sensor. In the case of an infrared sensor, if the earphone 1L is worn on the left ear of the user, the wearing sensor SEL can detect the wearing of the earphone 1L on the left ear of the user by receiving infrared rays emitted from the wearing sensor SEL and reflected inside the left ear. If the earphone 1L is not worn on the left ear of the user, the wearing sensor SEL can detect that the earphone 1L is not worn on the left ear of the user by not receiving infrared rays as the infrared rays emitted from the wearing sensor SEL are not reflected. On the other hand, in the case of an electrostatic sensor, if the earphone 1L is worn on the left ear of the user, the wearing sensor SEL can detect the wearing on the left ear of the user by determining that a change value of an electrostatic capacitance according to a distance from the earphone 1L to the inside of the left ear of the user is greater than a threshold retained by the wearing sensor SEL. If the earphone 1L is not worn on the left ear of the user, the wearing sensor SEL can detect that the earphone 1L is not worn on the left ear of the user by determining that the change value of the electrostatic capacitance is smaller than the threshold retained by the wearing sensor SEL. The wearing sensor SEL is provided at a position facing the ear canal of the left ear of the user when the earphone 1L is inserted into the left ear and on a back side of the touch sensor TCL.

Figure 3:
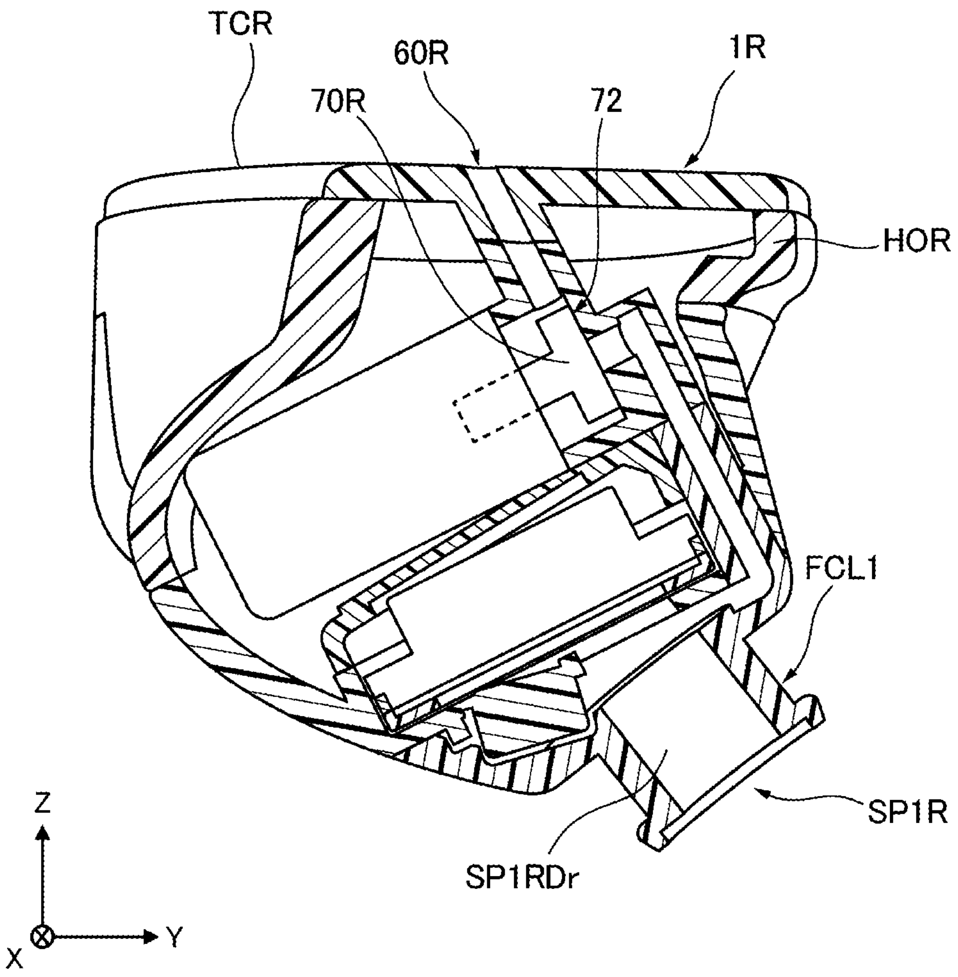
FIG. 3 is a diagram of an opening and closing valve in a closed state.
Figure 4:
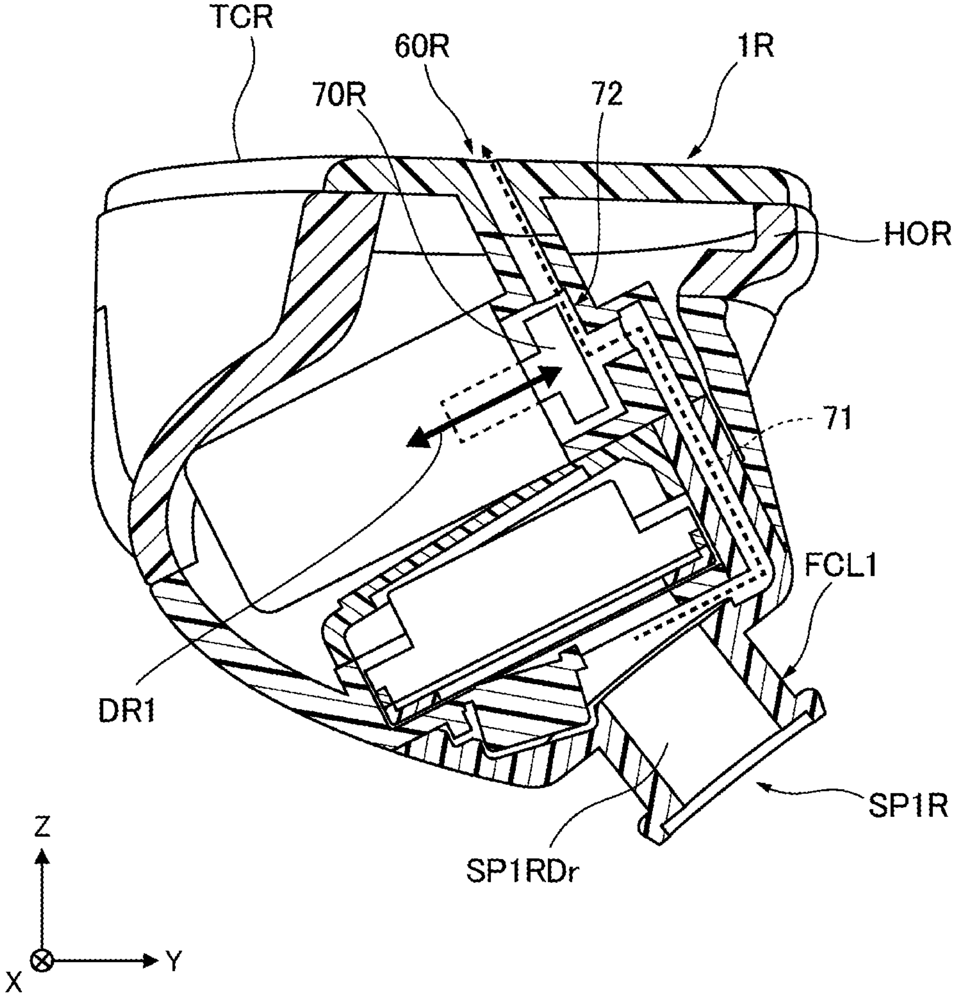
FIG. 4 is a diagram of the opening and closing valve in an open state.

Next, an open state and a closed state of an opening and closing valve will be described with reference to FIGS. 3 and 4. FIG. 3 is a diagram of the opening and closing valve in the closed state. FIG. 4 is a diagram of the opening and closing valve in the open state. FIGS. 3 and 4 are diagrams of the earphone 1R, and the earphone 1L also has a similar structure, and thus description thereof is omitted here. In FIGS. 3 and 4, illustration of earpieces IPL and IPR (see FIGS. 1 and 2) is omitted.

Cross-sectional views shown in FIGS. 3 and 4 are A-A cross-sectional views of the earphone 1R according to FIG. 1.

An opening and closing valve 70R is a device having a movable mechanism that controls air passing through a path 71. The opening and closing valve 70R switches between an open state and a sealed state of the path 71 for releasing a sound remaining in the housing HOR to the outside of the housing HOR. The sound remaining in the housing HOR is, for example, an echo sound of a sound output from a driver SP1RDr, or a transmission sound acoustically transmitted to the vicinity of the right ear through a body of the user due to a speech of the user. These sounds cause discomfort or difficulty in hearing external sounds when the user speaks while wearing the earphone 1R. An operation (specifically, opening and closing) of the opening and closing valve 70R is controlled by an earphone control unit S2R. The valve may be, for example, a gate valve shown in FIG. 3, a globe valve, a needle valve, a ball valve, or a butterfly valve.

The opening and closing valve 70R is movable in a direction DR1 based on a signal (control signal) from the earphone control unit S2L. The opening and closing valve 70R is movable in the direction DR1 and can block the path 71 and be in close contact with a wall surface 72 by coming into contact with the wall surface 72. A state in which the opening and closing valve 70 shown in FIG. 3 is in contact with the wall surface 72 and blocks the path 71 is referred to as the "closed state". When the user wears the earphone 1R on the right ear and the opening and closing valve 70 is in the closed state, the path 71 is blocked by the opening and closing valve 70R, and the ear of the user is sealed.

A state in which the opening and closing valve 70R shown in FIG. 4 is separated from the wall surface 72 by a certain distance and the path 71 is opened is referred to as the "open state". The opening and closing valve 70R is movable in the direction DR1, and when the opening and closing valve 70R is separated from the wall surface 72, the path 71 is opened. When the user wears the earphone 1R on the right ear and the opening and closing valve 70R is in the open state, the path 71 is not blocked by the opening and closing valve 70R and communicates with the ambient environment on the side of the touch sensor TCR, and thus the ear of the user is not sealed. In this state, the sound remaining in the housing HOR is released to the outside of the housing HOR via the path 71, and thus when the user speaks while wearing the earphone 1R, it is expected to prevent the user from feeling uncomfortable or having difficulty in hearing when listening to external sounds.

Figure 5:
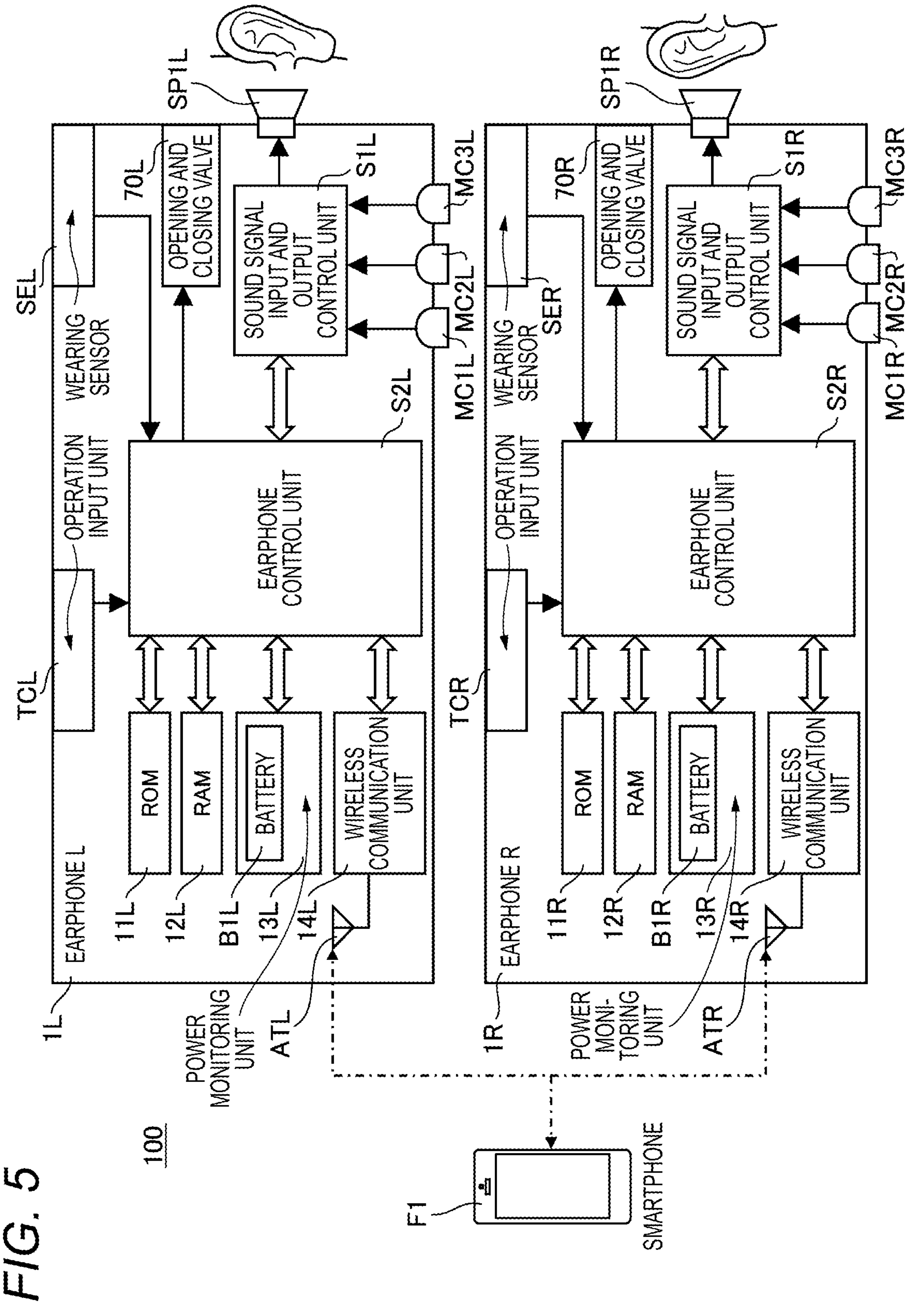
FIG. 5 shows a block diagram of the earphone according to a present embodiment.

Next, a block diagram of the earphone will be described with reference to FIG. 5. FIG. 5 shows the block diagram of the earphone according to the present embodiment. FIG. 5 shows block diagrams of the pair of left and right earphones 1L and 1R shown in FIGS. 1 and 2. A configuration of the earphone 1L of the pair of left and right earphones 1L and 1R will be described below, and a configuration of the earphone 1R is the same as that of the earphone 1L. Therefore, description of the earphone 1R is also omitted in FIG. 5.

An earphone control system 100 includes the earphone 1L, the earphone 1R, and the smartphone F1.

The touch sensor TCL, which is an example of the operation input unit, is communicably connected to the earphone control unit S2L. The touch sensor TCL outputs a signal related to the touch operation performed by the user to the earphone control unit S2L.

The wearing sensor SEL is communicably connected to the earphone control unit S2L, and outputs a signal related to whether the ear of the user is in contact with the earphone 1L to the earphone control unit S2L.

A power monitoring unit 13L is configured with, for example, a semi-conductor chip. The power monitoring unit 13L includes the battery B1L and measures a remaining charge amount of the battery B1L. The battery B1L is, for example, a lithium ion battery. The power monitoring unit 13L outputs information related to the measured remaining charge amount of the battery B1L to the earphone control unit S2L.

The sound signal input and output control unit S1L is implemented with, for example, a processor such as a central processing unit (CPU), a micro processing unit (MPU), or a digital signal processor (DSP).

The sound signal input and output control unit S1L is communicably connected to the earphone control unit S2L, and exchanges a sound signal as a digital signal converted into a digital format by a pulse code modulation (PCM) method. The sound signal input and output control unit S1L adjusts a volume level of a digital signal related to a sound signal acquired from the smartphone F1 and outputs the digital signal to the speaker SP1L.

The sound signal input and output control unit S1L is connected to the microphone MC1L, the microphone MC2L, and the microphone MC3L, and receives, from the microphones, sound signals picked up by the microphones. The sound signal input and output control unit S1L may be capable of performing processing such as amplifying the sound signals input from the microphones or converting an analog signal into a digital signal. The sound signal input and output control unit S1L transmits data of the sound signals input from the microphones to the earphone control unit S2L.

As an example of a control unit, the earphone control unit S2L is configured with a processor such as a CPU, an MPU, or a DSP, is communicably connected to the sound signal input and output control unit S1L, a ROM 11L, a RAM 12L, the power monitoring unit 13L, an opening and closing valve 70L, and a wireless communication unit 14L, and exchanges a sound signal as a digital signal converted into a digital format by a PCM method. The earphone control unit S2L functions as a controller that controls the overall operation of the earphone 1L, and performs control processing for controlling operations of the units of the earphone 1L, input and output processing of data with the units of the earphone 1L, arithmetic processing of data, and storage processing of data.

The sound signal input and output control unit S1L and the earphone control unit S2L implement respective functions by using programs and data stored in the ROM (read only memory) 11L. The sound signal input and output control unit S1L and the earphone control unit S2L may use the RAM (random access memory) 12L during operation and temporarily store generated or acquired data or information in the RAM 12L.

The wireless communication unit 14L wirelessly connects the earphone 1L and the smartphone F1 so as to enable transmission and reception, and transmits a sound signal processed by the sound signal input and output control unit S1L or the earphone control unit S2L to the smartphone F1. The wireless communication unit 14L includes an antenna ATL and performs short-range wireless communication according to, for example, a communication standard of Bluetooth (registered trademark). The wireless communication unit 14L may be provided to be connectable to a communication line such as Wi-Fi (registered trademark) or a mobile communication line. The earphones 1L and 1R can individually perform wireless communication with the smartphone F1 using the respective wireless communication unit 14L and a wireless communication unit 14R. Therefore, the earphones 1L and 1R can receive data, a sound signal, or information transmitted from the smartphone F1.

The opening and closing valve 70L is communicably connected to the earphone control unit S2L. The opening and closing valve 70L operates (that is, opens and closes) based on a signal from the earphone control unit S2L. The opening and closing valve 70L is controlled to be in the open state or the closed state by the earphone control unit S2L based on, for example, contents set from a setting screen displayed on the smartphone F1. In the present embodiment, for example, the opening and closing valve 70L is controlled by a volume of music output from earphone 1L, an amount of a sound leaking from the earphone 1L, a sound of the ambient environment, or the like. The method of controlling the opening and closing valve 70L is not limited thereto, and the opening and closing valve 70L may be controlled depending on whether a call is in progress.

The smartphone F1 is a wireless terminal carried by the user.

Figure 6:
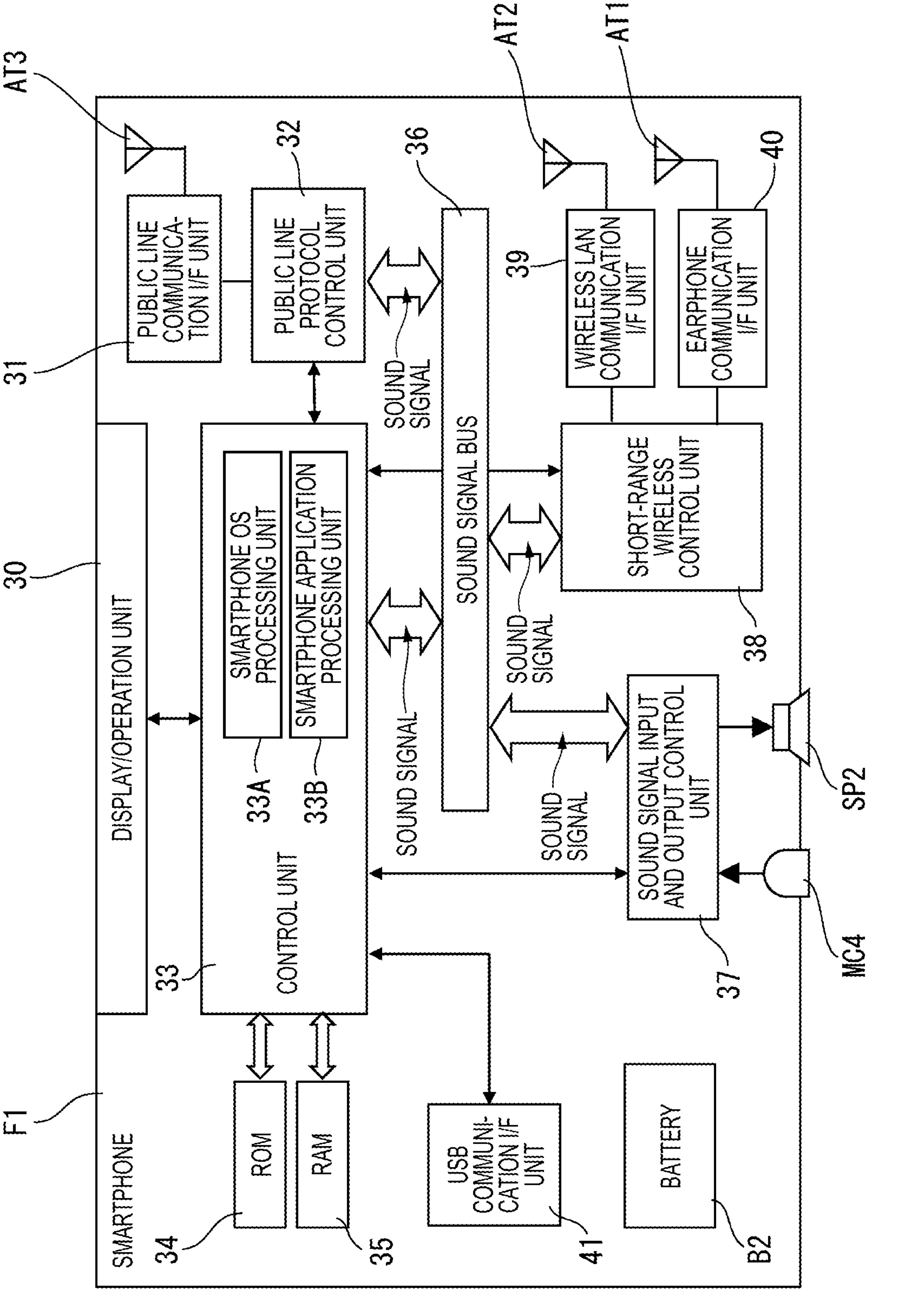
FIG. 6 is a block diagram of a smartphone according to the present embodiment.

Next, a hardware configuration example of a smartphone will be described with reference to a block diagram of the smartphone in FIG. 6. FIG. 6 is the block diagram of the smartphone according to the present embodiment. The smartphone F1 includes a display/operation unit 30, a public line communication I/F unit 31, a public line protocol control unit 32, a control unit 33, a ROM 34, a RAM 35, a sound signal bus 36, a sound signal input and output control unit 37, a short-range wireless control unit 38, a wireless LAN communication I/F unit 39, an earphone communication I/F unit 40, a USB communication I/F unit 41, and a battery B2. In FIG. 6, an interface is abbreviated as "I/F".

The display/operation unit 30 as an example of a display unit or an operation unit is implemented with a touch panel that receives an operation of the user and displays data generated by the control unit 33, and forms a user interface. The display/operation unit 30 may display various screens generated by the control unit 33. The display/operation unit 30 receives user operations on the various displayed screens, generates input signals, and transmits the input signals to the control unit 33.

The public line communication I/F unit 31 is connected to an antenna AT3 provided in the smartphone F1, and performs wireless communication (for example, wireless communication conforming to 4G (fourth generation mobile communication scheme) or 5G (fifth generation mobile communication scheme) such as long term evolution (LTE)) with a public base station (not shown) using a public line. The public line communication I/F unit may be omitted from the configuration of the smartphone F1.

The public line protocol control unit 32 executes control related to input and output of data between the sound signal bus 36 and the public line communication I/F unit 31. The public line protocol control unit 32 may be omitted from the configuration of the smartphone F1.

The control unit 33 is implemented with, for example, a processor such as a CPU, an MPU, or a DSP. A smartphone OS processing unit 33A and a smartphone application processing unit 33B are functionally provided, and the smartphone OS processing unit 33A and the smartphone application processing unit 33B cooperate with the ROM 34 to perform various types of processing and control.

A program that defines an operation of the control unit 33 and data used when the program is executed are written in the ROM 34. The ROM 34 stores identification information of the smartphone F1 and identification information of the earphone 1 registered in advance as a transmission target of a sound signal.

The RAM 35 is a RAM serving as a work memory used when various types of processing of the control unit 33 are executed. The RAM 35 temporarily stores data or information generated or acquired by the control unit 33.

The sound signal bus 36 inputs and outputs sound signal data to and from the control unit 33, the public line protocol control unit 32, the sound signal input and output control unit 37, and the short-range wireless control unit 38.

Based on a command output from the control unit 33, the sound signal input and output control unit 37 transmits sound signal data picked up by a microphone MC4 to the control unit 33 via the sound signal bus 36, and causes the sound signal input via the sound signal bus 36 to be output from a speaker SP2.

The microphone MC4 picks up a voice based on a speech of the user who uses the smartphone F1, converts the voice into a sound signal, and transmits the converted sound signal to the sound signal input and output control unit 37. The sound signal picked up by the microphone MC4 is input to the control unit 33 via the sound signal input and output control unit 37 and the sound signal bus 36.

The speaker SP2 acoustically outputs the sound signal data from the sound signal input and output control unit 37.

The short-range wireless control unit 38 executes control related to input and output of data between the sound signal bus 36 and the wireless LAN communication OF unit 39 and between the sound signal bus 36 and the earphone communication OF unit 40. The short-range wireless control unit 38 transmits the command output from the control unit 33 and the sound signal data input via the sound signal bus 36 to the wireless LAN communication OF unit 39 or the earphone communication OF unit 40. In addition, the short-range wireless control unit 38 may transmit the sound signal data input from the wireless LAN communication OF unit 39 or the earphone communication OF unit 40 to the control unit 33.

The wireless LAN communication I/F unit 39 is connected to an antenna AT2 provided in the smartphone F1, and performs wireless communication (for example, data transmission from the short-range wireless control unit 38) with the earphone 1 by wireless LAN. The wireless LAN communication I/F unit 39 is implemented with a communication circuit connectable to the Internet via a wireless LAN router (not shown). The wireless LAN communication I/F unit 39 may perform wireless communication (for example, wireless LAN such as Wi-Fi (registered trademark)) with the earphones 1L and 1R via the wireless LAN router (not shown) described above.

The earphone communication I/F unit 40 is connected to an antenna AT1 provided in the smartphone F1, and performs short-range wireless communication (for example, data transmission from the short-range wireless control unit 38) with the earphone 1 by Bluetooth (registered trademark).

The USB communication I/F unit 41 is an interface that allows the smartphone F1 and an external device (for example, a personal computer (PC)) to communicate with each other by a wire such as a cable. The USB communication I/F unit 41 is connected to the control unit 33 so as to perform data communication, and can transmit data from an external device to the control unit 33. In addition, electric charge may be supplied from an external commercial power supply to the battery B2 via the USB communication I/F unit 41.

The battery B2 supplies power to the smartphone F1, which is a battery capable of storing electric charge supplied from an external commercial power supply. The battery B2 may be detachable. The battery B2 may directly obtain power supply from an external commercial power supply, or may supply power to the smartphone F1 in a state of being disconnected from the external commercial power supply.

Figure 7:
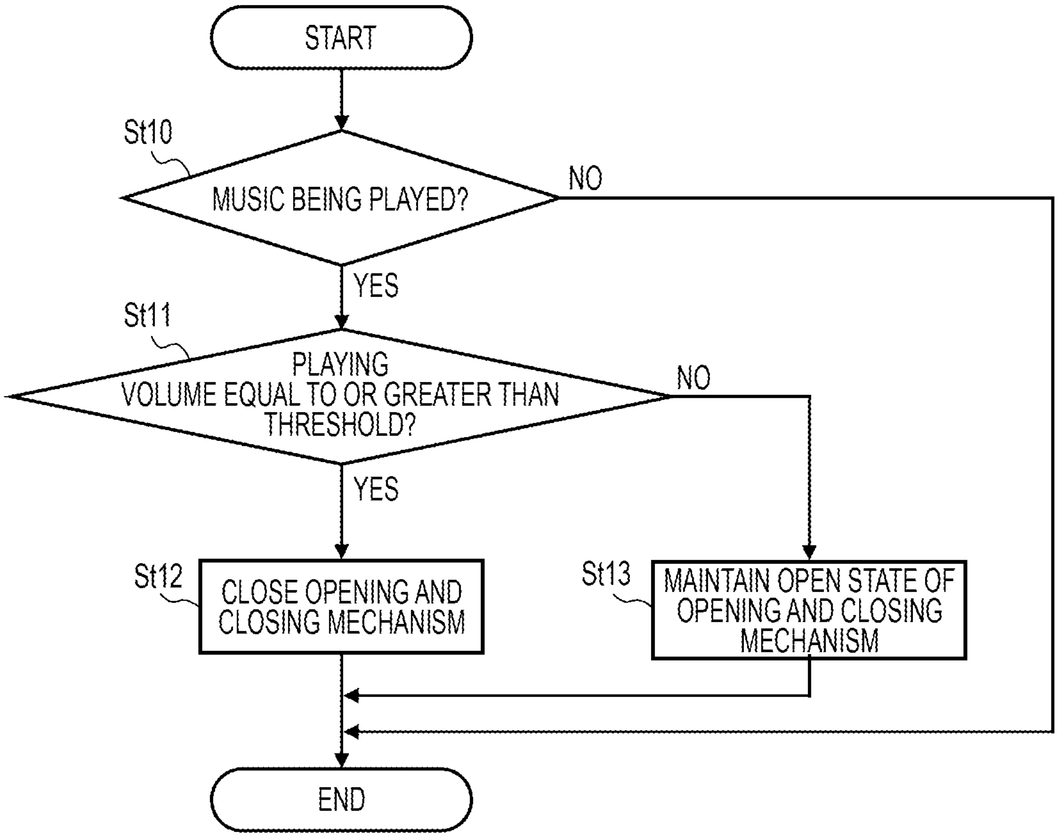
FIG. 7 is a flowchart showing processing of controlling the opening and closing valve according to a playing volume.

Next, processing of controlling the opening and closing valve according to a playing volume will be described with reference to FIG. 7. FIG. 7 is a flowchart showing the processing of controlling the opening and closing valve according to the playing volume. Each processing according to the flowchart of FIG. 7 is executed by the earphone control units S2L and S2R. Here, the earphone control unit S2L is described for convenience of description. The earphone control unit S2R executes the same processing as the earphone control unit S2L. In the example of FIG. 7, it is assumed that the opening and closing valve 70L is in the open state in an initial state.

The earphone control unit S2L determines whether music is being played, that is, whether a music signal is being acoustically output from the speaker SP1L (St 10). When executing the processing of step St 10, the earphone control unit S2L acquires a signal related to whether a music signal is being acoustically output from the speaker SP1L to the sound signal input and output control unit S1L. When an instruction to cause the speaker SP1L to acoustically output a music signal is transmitted to the sound signal input and output control unit S1L by the earphone control unit S2L, the earphone control unit S2L may store information on whether the music signal is being acoustically output in the RAM 12L and acquire, from the RAM 12L, the information on whether the music signal is being acoustically output.

When the earphone control unit S2L determines that no music signal is being acoustically output from the speaker SP1L (NO in St 10), the processing ends.

When determining that a music signal is being acoustically output from the speaker SP1L (YES in St 10), the earphone control unit S2L acquires information on the magnitude of a volume (hereinafter, referred to as the playing volume) of the music signal (that is, music being played) being acoustically output from the sound signal input and output control unit S1L to the speaker SP1L. The earphone control unit S2L determines whether the acquired volume is equal to or greater than a predetermined threshold (St 11).

When determining that the playing volume is less than the predetermined threshold (NO in St 11), the earphone control unit S2L sends no signal to the opening and closing valve and the open state of the opening and closing valve 70L is maintained (St 13). When the opening and closing valve 70L is in the closed state in the initial state, the earphone control unit S2L transmits a signal for setting the open state of the opening and closing valve 70L to the opening and closing valve 70L. The opening and closing valve 70L is set to the open state based on the signal acquired from the earphone control unit S2L.

When determining that the playing volume is equal to or greater than the predetermined threshold (YES in St 11), the earphone control unit S2L transmits a signal for setting the closed state of the opening and closing valve 70L to the opening and closing valve 70L. The opening and closing valve 70L is set to the closed state based on the signal acquired from the earphone control unit S2L in the processing of step St 11 (St 12).

As a result, the earphone 1 can change the states of the opening and closing valve and the opening and closing valve 70R based on the playing volume. Thus, the earphone 1 can prevent sound leakage to the surroundings.

Figure 8:
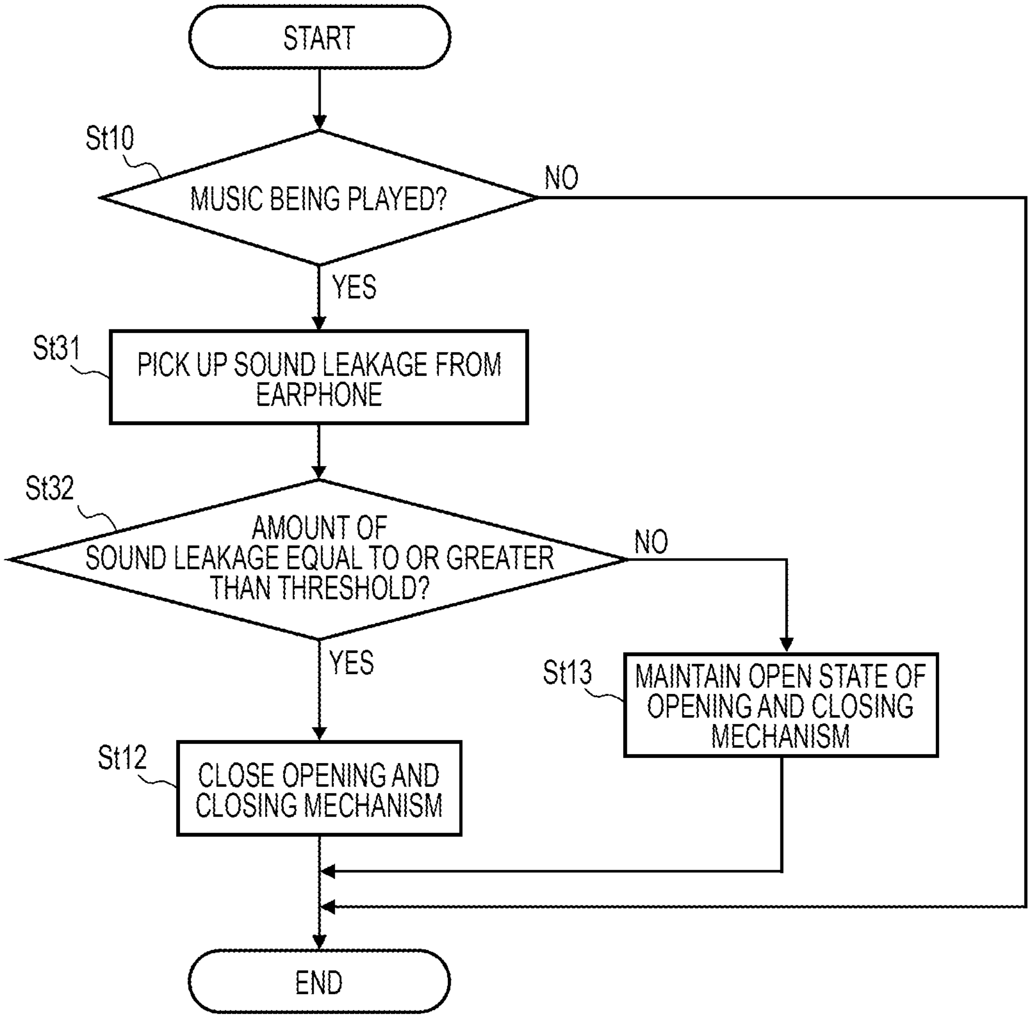
FIG. 8 is a flowchart showing processing of controlling the opening and closing valve according to an amount of sound leakage.

Next, processing of controlling the opening and closing valve according to an amount of sound leakage will be described with reference to FIG. 8. FIG. 8 is a flowchart illustrating the processing of controlling the opening and closing valve according to the amount of sound leakage. Each processing according to the flowchart of FIG. 8 is executed by the earphone control units S2L and S2R. Here, the earphone control unit S2L is described for convenience of description. The earphone control unit S2R executes the same processing as the earphone control unit S2L. In the example of FIG. 8, it is assumed that the opening and closing valve 70L is in the open state in an initial state.

The earphone control unit S2L determines whether music is being played, that is, whether a music signal is being acoustically output from the speaker SP1L (St 10). When executing the processing of step St 10, the earphone control unit S2L acquires a signal related to whether a music signal is being acoustically output from the speaker SP1L to the sound signal input and output control unit S1L. When an instruction to cause the speaker SP1L to acoustically output a music signal is transmitted to the sound signal input and output control unit S1L by the earphone control unit S2L, the earphone control unit S2L may store information on whether the music signal is being acoustically output in the RAM 12L and acquire, from the RAM 12L, the information on whether the music signal is being acoustically output.

When the earphone control unit S2L determines that no music signal is being acoustically output from the speaker SP1L (NO in St 10), the processing ends.

When determining that music is being output from the speaker SP1L (YES in St the earphone control unit S2L acquires, from the sound signal input and output control unit S1L, a signal of a leakage sound from between the left ear of the user and the earpiece IPL, which is picked up by the microphone MC3L. The earphone control unit S2L compares a sound pressure of the sound signal of the leakage sound acquired from the sound signal input and output control unit S1L with a sound pressure of a sound signal when no sound leaks from between the left ear of the user and the earpiece IPL. The earphone control unit S2L detects, based on a result of the comparison described above, a volume (hereinafter, referred to as the amount of sound leakage) of the sound leaking from between the left ear of the user and the earpiece IPL (St 31).

The earphone control unit S2L determines whether a value of the amount of sound leakage detected in the processing of step St 31 is equal to or greater than a predetermined threshold (St 32).

When determining that the value of the amount of sound leakage is less than the threshold (NO in St 32), the earphone control unit S2L sends no signal to the opening and closing valve 70L, and the open state of the opening and closing valve 70L is maintained (St 13). When the opening and closing valve 70L is in the closed state in the initial state, the earphone control unit S2L transmits a signal for setting the open state of the opening and closing valve 70L to the opening and closing valve 70L. The opening and closing valve 70L is set to the open state based on the signal acquired from the earphone control unit S2L. In the processing according to FIG. 9, when the opening and closing valve 70L in the initial state is in the closed state in relation to the processing of step St 27, the opening and closing valve is the same as described above.

When determining that the value of the amount of sound leakage is equal to or greater than the threshold (YES in St 32), the earphone control unit S2L transmits a signal for setting the closed state of the opening and closing valve 70L to the opening and closing valve 70L. The opening and closing valve 70L is set to the closed state based on the signal acquired from the earphone control unit S2L in the processing of step St 32 (St 12).

As a result, the earphone 1 can control the opening and closing valve 70L and the opening and closing valve 70R according to the amount of sound leakage. As a result, the earphone 1 can prevent sound leakage due to the opening and closing valve 70L or the opening and closing valve 70R being in the open state.

Figure 9:
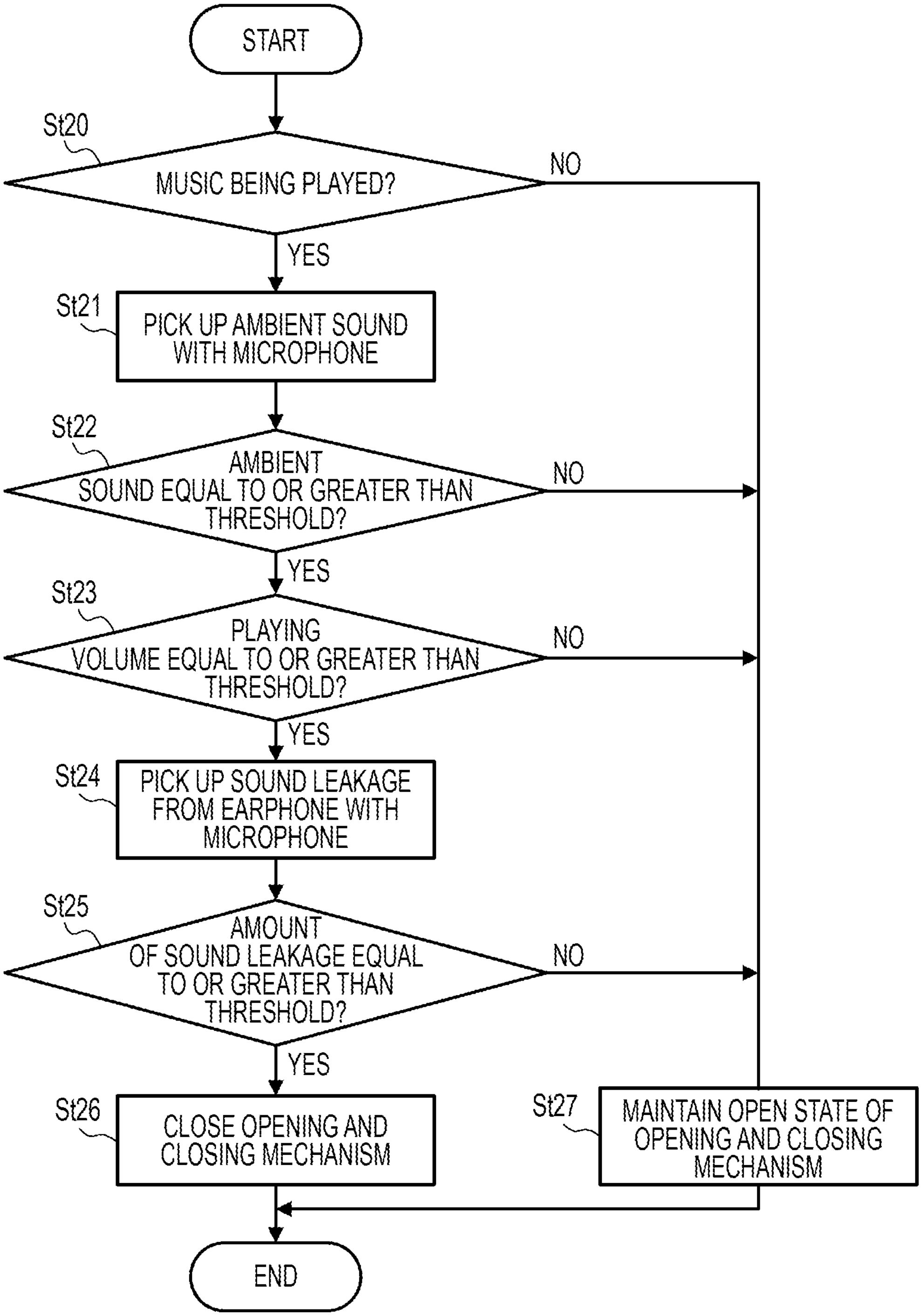
FIG. 9 is a flowchart showing processing of controlling the opening and closing valve according to a sound of the ambient environment, the playing volume, and the amount of sound leakage.

Next, processing of controlling the opening and closing valve based on a sound of the ambient environment, the playing volume, and the amount of sound leakage will be described with reference to FIG. 9. FIG. 9 is a flowchart showing the processing of controlling the opening and closing valve according to a sound of the ambient environment, the playing volume, and the amount of sound leakage. Each processing according to the flowchart of FIG. 9 is executed by the earphone control units S2L and S2R. Here, the earphone control unit S2L is described for convenience of description. The earphone control unit S2R executes the same processing as the earphone control unit S2L. In the example of FIG. 8, it is assumed that the opening and closing valve 70L is in the open state in an initial state.

The earphone control unit S2L determines whether music is being played, that is, whether a music signal is being acoustically output from the speaker SP1L (St 20). When executing the processing of step St 20, the earphone control unit S2L acquires, from the sound signal input and output control unit S1L, a signal related to whether a music signal is being acoustically output from the speaker SP1L. When an instruction to cause the speaker SP1L to acoustically output a music signal is transmitted to the sound signal input and output control unit S1L by the earphone control unit S2L, the earphone control unit S2L may store information on whether the music signal is being acoustically output in the RAM 12L and acquire, from the RAM 12L, the information on whether the music signal is being acoustically output.

When determining that no music signal is being acoustically output from the speaker SP1L (NO in St20), the earphone control unit S2L sends no signal to the opening and closing valve 70L, and the open state of the opening and closing valve 70L is maintained (St 27). When the opening and closing valve 70L is in the closed state in the initial state, the earphone control unit S2L transmits a signal for setting the open state of the opening and closing valve 70L to the opening and closing valve 70L. The opening and closing valve 70L is set to the open state based on the signal acquired from the earphone control unit S2L.

When determining that a music signal is being acoustically output from the speaker SP1L (YES in St 20), the earphone control unit S2L transmits a signal to the sound signal input and output control unit S1L to cause the microphone MC1L to detect a sound of the ambient environment (hereinafter, referred to as an ambient sound). The sound signal input and output control unit S1L causes the microphone MC1L to detect an ambient sound based on a signal acquired from the earphone control unit S2L. The sound signal input and output control unit S1L transmits information on the ambient sound acquired from the microphone MC1L to the earphone control unit S2L. The earphone control unit S2L acquires the information on the ambient sound from the sound signal input and output control unit S1L (St 21).

The earphone control unit S2L determines whether the ambient sound acquired in the processing of step St 21 is equal to or greater than a predetermined threshold (St 22).

When determining that the ambient sound is less than the predetermined threshold (NO in St 22), the earphone control unit S2L sends no signal to the opening and closing valve and the open state of the opening and closing valve 70L is maintained (St 27).

When determining that the ambient sound is equal to or greater than the predetermined threshold (YES in St 22), the earphone control unit S2L acquires, from the sound signal input and output control unit S1L, information on the magnitude of a playing volume of the music signal (that is, music being played) being output from the speaker SP1L. The earphone control unit S2L determines whether the volume acquired from the speaker SP1L is equal to or greater than a predetermined threshold (St 23).

When determining that the playing volume is less than the predetermined threshold (NO in St 23), the earphone control unit S2L sends no signal to the opening and closing valve and the open state of the opening and closing valve 70L is maintained (St 27).

When determining that the playing volume is equal to or greater than the predetermined threshold (YES in St 23), the earphone control unit S2L transmits a signal to the sound signal input and output control unit S1L to cause the microphone MC3L to detect sound leakage from between the left ear of the user and the earpiece IPL. The microphone MC3L converts a detected sound into a sound signal and outputs the sound signal to the sound signal input and output control unit S1L. The sound signal input and output control unit S1L outputs the acquired sound signal to the earphone control unit S2L. The earphone control unit S2L compares a sound pressure of the sound signal acquired from the sound signal input and output control unit S1L with a sound pressure of a sound signal when no sound leaks from between the left ear of the user and the earpiece IPL. The earphone control unit S2L detects an amount of sound leakage based on a result of the comparison described above (St 24).

The earphone control unit S2L determines whether a value of the amount of sound leakage detected in the processing of step St 24 is equal to or greater than a predetermined threshold (St 25).

When determining that the value of the amount of sound leakage is less than the threshold (NO in St 25), the earphone control unit S2L sends no signal to the opening and closing valve 70L, and the open state of the opening and closing valve 70L is maintained (St 27).

When determining that the value of the amount of sound leakage is equal to or greater than the threshold (YES in St 25), the earphone control unit S2L transmits a signal for setting the closed state of the opening and closing valve 70L to the opening and closing valve 70L. The opening and closing valve 70L is set to the closed state based on the signal acquired from the earphone control unit S2L in the processing of step St 22 (St 26).

As a result, the earphone 1 can control the opening and closing valve 70L and the opening and closing valve 70R in consideration of an ambient sound, a playing volume, and an amount of sound leakage. The earphone 1 may control the opening and closing valve 70L and the opening and closing valve 70R in consideration of all the ambient sound, the playing volume, and the amount of sound leakage, or may control the opening and closing valve 70L and the opening and closing valve 70R based on any two of the ambient sound, the playing volume, and the amount of sound leakage. In addition, the earphone 1 may control the opening and closing valve 70L and the opening and closing valve 70R in consideration of the ambient sound.

In FIGS. 7, 8, and 9, what the earphone 1 is playing is not limited to music, and may be sound signals related to radio, recorded data, video, etc. transmitted from the smartphone F1.

Figure 10:
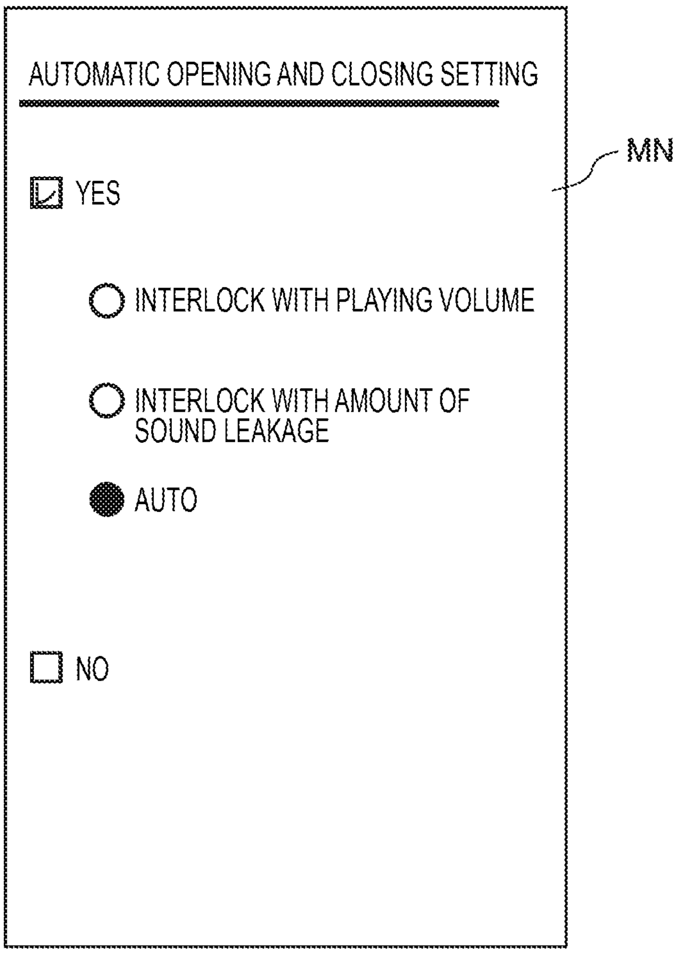
FIG. 10 is a diagram showing an example of a screen for opening and closing setting of the opening and closing valve.

Next, an example of a screen for opening and closing setting of the opening and closing valve will be described with reference to FIG. 10. FIG. 10 is a diagram showing an example of the screen for opening and closing setting of the opening and closing valve.

A screen MN is an example of a screen displayed on the smartphone F1. The user can perform the opening and closing setting of the opening and closing valve 70L and the opening and closing valve 70R by performing a touch operation on the screen MN.

When the user touches "Yes" on the screen MN and puts a check mark, automatic opening and closing setting of the opening and closing valve 70L and the opening and closing valve 70R is turned on. The automatic opening and closing setting being ON means that the opening and closing valve 70L is controlled by the earphone control unit S2L to be in the open state or the closed state. The opening and closing valve 70R is controlled by the earphone control unit S2R to be in the open state or the closed state. Hereinafter, the opening and closing valve 70L is used as a representative, and the opening and closing valve 70R is omitted. When the automatic opening and closing setting is turned off, the opening and closing valve 70L may be fixed in the open state or the closed state.

When the user touches "NO" on the screen MN and puts a check mark, the automatic opening and closing setting of the opening and closing valve 70L is turned off.

When the user touches "interlock with playing volume" on the screen MN and puts a check mark, the opening and closing valve 70L is set to be controlled based on the playing volume.

When the user touches "interlock with amount of sound leakage" on the screen MN and puts a check mark, the opening and closing valve 70L is set to be controlled based on the amount of sound leakage.

When the user touches "Auto" on the screen MN and puts a check mark, the opening and closing valve 70 is set to be controlled based on any one of the ambient sound, the playing volume, and the amount of sound leakage.

As described above, the earphone 1 according to the present embodiment includes a housing (for example, the housing HOL or the housing HOR) having a space therein and an air-permeable path from one end of an ear canal of a user to the other end of the ambient environment. The earphone 1 includes an opening and closing valve (for example, the opening and closing valve 70L or the opening and closing valve 70R) that is accommodated in the housing and can block a part of the path. The earphone 1 includes a speaker (for example, the speaker SP1L or the speaker SP1R) that is accommodated in the housing and outputs a sound signal, and a first microphone (for example, the microphone MC3L or the microphone MC3R) that detects a leakage amount of a sound output from the speaker and leaking from an ear of the user. The earphone 1 includes a control unit (for example, the earphone control unit S2L or the earphone control unit S2R) that causes the speaker to output a sound signal, and the control unit sets the opening and closing valve to an open state or a closed state based on a volume of the sound signal or the leakage amount of the sound.

As a result, the earphone 1 can control the opening and closing valve 70L and the opening and closing valve 70R based on a volume or an amount of sound leakage of a sound signal even when music or the like is being played, and can open the opening and closing valve 70L and the opening and closing valve 70R in consideration of sound leakage to the surroundings. As a result, the earphone 1 can adaptively control a sealed state or an open state of an earphone according to the ambient environment.

The control unit of the earphone 1 according to the present embodiment sets the opening and closing valve to the closed state when a volume of a sound signal is equal to or greater than a first threshold, and sets the opening and closing valve to the open state when the volume of the sound signal is less than the first threshold. As a result, even when there is a concern of sound leakage to the ambient environment due to the opening and closing valve and the opening and closing valve 70R being in the open state, the earphone 1 can control the opening and closing valve 70L and the opening and closing valve 70R according to a playing volume, thereby preventing sound leakage.

The control unit of the earphone 1 according to the present embodiment sets the opening and closing valve to the closed state when the leakage amount of the sound is equal to or greater than a second threshold, and sets the opening and closing valve to the open state when the amount of sound leakage is less than the second threshold. As a result, even when there is a concern of sound leakage to the ambient environment due to the opening and closing valve 70L and the opening and closing valve 70R being in the open state, the earphone 1 can detect an amount of sound leakage and control the opening and closing valve and the opening and closing valve 70R according to the amount of sound leakage, thereby preventing sound leakage.

When the volume of the sound signal is equal to or greater than the first threshold and the leakage amount of the sound is equal to or greater than the second threshold, the control unit of the earphone 1 according to the present embodiment sets the opening and closing valve to the closed state. As a result, even when there is a concern of sound leakage to the ambient environment due to the opening and closing valve 70L and the opening and closing valve 70R being in the open state, the earphone 1 can control the opening and closing valve 70L and the opening and closing valve 70R according to the playing volume and the amount of sound leakage, thereby preventing sound leakage.

The earphone 1 according to the present embodiment further includes a second microphone (for example, the MC1L or the MC1R) that picks up a sound of the ambient environment, and the control unit sets the opening and closing valve to the open state or the closed state based on the ambient environmental sound. As a result, the earphone 1 can adaptively control a sealed state or an open state of an earphone according to the ambient environment.

When a sound of the ambient environment is equal to or greater than a third threshold and the volume of the sound signal is equal to or greater than the first threshold, the control unit of the earphone 1 according to the present embodiment sets the opening and closing valve to the closed state. As a result, when it is expected that the sound of the ambient environment is loud and there are people around, and the playing volume is high, the earphone 1 can set the opening and closing valve 70L and the opening and closing valve 70R to the closed state. As a result, the earphone 1 can adaptively control a sealed state or an open state of an earphone according to the ambient environment.

When the sound of the ambient environment is equal to or greater than the third threshold and the leakage amount of the sound is equal to or greater than the second threshold, the control unit of the earphone 1 according to the present embodiment sets the opening and closing valve to the closed state. As a result, when it is expected that the ambient environmental sound is loud and there are people around, and the amount of sound leakage is large, the earphone 1 can set the opening and closing valve 70L and the opening and closing valve 70R to the closed state. As a result, the earphone 1 can adaptively control a sealed state or an open state of an earphone according to the ambient environment.

When the sound of the ambient environment is equal to or greater than the third threshold, the volume of the sound signal is equal to or greater than the first threshold, and the leakage amount of the sound is equal to or greater than the second threshold, the control unit of the earphone 1 according to the present embodiment sets the opening and closing valve to the closed state. As a result, when it is expected that the ambient environmental sound is loud and there are people around, the playing volume is high, and the amount of sound leakage is large, the earphone 1 can set the opening and closing valve 70L and the opening and closing valve 70R to the closed state. As a result, the earphone 1 can adaptively control a sealed state or an open state of an earphone according to the ambient environment.

Although the embodiment has been described above with reference to the accompanying drawings, the present disclosure is not limited to such an example. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. The components in the embodiment described above may be freely combined without departing from the gist of the invention.

INDUSTRIAL APPLICABILITY

The technique of the present disclosure is useful as an earphone, an earphone control method, and a program for adaptively controlling a sealed state or an open state of an earphone according to the ambient environment.

What is claimed is:

1. An earphone comprising:

a housing having a space therein and an air-permeable path from one end of an ear canal of a user to another end of an ambient environment located at the other end of the ear canal;

an opening and closing valve accommodated in the housing and capable of blocking a part of the path;

a speaker accommodated in the housing and configured to output a sound signal; and a control unit configured to cause the speaker to output the sound signal, wherein the control unit, in operation, sets, based on a volume of the sound signal, the opening and closing valve to a closed state when the volume of the sound signal is equal to or greater than a first threshold, and sets the opening and closing valve to an open state when the volume of the sound signal is less than the first threshold.

2. The earphone according to claim 1, further comprising:

a first microphone configured to detect a leakage amount of a sound output from the speaker and leaking from an ear of the user, wherein the control unit sets the opening and closing valve to the closed state when the leakage amount of the sound is equal to or greater than a second threshold, and sets the opening and closing valve to the open state when the leakage amount of the sound is less than the second threshold.

3. The earphone according to claim 1, further comprising, a first microphone configured to detect a leakage amount of a sound output from the speaker and leaking from an ear of the user, wherein when the volume of the sound signal is equal to or greater than a first threshold and the leakage amount of the sound is equal to or greater than a second threshold, the control unit sets the opening and closing valve to the closed state.

4. The earphone according to claim 1, further comprising:

a second microphone configured to pick up a sound of the ambient environment, wherein the control unit sets the opening and closing valve to the open state or the closed state based on the sound of the ambient environment.

5. The earphone according to claim 4, wherein when the sound of the ambient environment is equal to or greater than a third threshold and the volume of the sound signal is equal to or greater than a first threshold, the control unit sets the opening and closing valve to the closed state.

6. The earphone according to claim 4, further comprising:

a first microphone configured to detect a leakage amount of a sound output from the speaker and leaking from an ear of the user, wherein when the sound of the ambient environment is equal to or greater than a third threshold and the leakage amount of the sound is equal to or greater than a second threshold, the control unit sets the opening and closing valve to the closed state.

7. The earphone according to claim 4, further comprising:

a first microphone configured to detect a leakage amount of a sound output from the speaker and leaking from an ear of the user, wherein when the sound of the ambient environment is equal to or greater than a third threshold, the volume of the sound signal is equal to or greater than a first threshold, and the leakage amount of the sound is equal to or greater than a second threshold, the control unit sets the opening and closing valve to the closed state.

8. An earphone control method including a housing having a space therein and an air-permeable path from one end of an ear canal of a user to another end of an ambient environment located at the other end of the ear canal, and an opening and closing valve accommodated in the housing and capable of blocking a part of the path, the earphone control method comprising:

outputting a sound signal; and setting, based on a volume of the sound signal, the opening and closing valve to a closed state when the volume of the sound signal is equal to or greater than a first threshold, and setting the opening and closing valve to an open state when the volume of the sound signal is less than the first threshold.

9. A non-transitory computer-readable storage medium on which a computer program causing a computer to execute the earphone control method according to claim 8 is stored.

10. An earphone comprising:

a housing having a space therein and an air-permeable path from one end of an ear canal of a user to another end of an ambient environment located at the other end of the ear canal;

an opening and closing valve accommodated in the housing and capable of blocking a part of the path;

a speaker accommodated in the housing and configured to output a sound signal;

a processor; and a memory storing a program that, when executed by the processor, causes the earphone to:

cause the speaker to output the sound signal, set, based on a volume of the sound signal, the opening and closing valve to a closed state when the volume of the sound signal is equal to or greater than a first threshold, and set the opening and closing valve to an open state when the volume of the sound signal is less than the first threshold.

* * * * *